March 19, 1940. E. E. KELLEMS ET AL 2,194,393
LATHE
Filed July 26, 1937 3 Sheets-Sheet 1

Inventors
HAROLD M. DUDEK
EDGAR E. KELLEMS
By Robert Cobb
Attorneys

March 19, 1940. E. E. KELLEMS ET AL 2,194,393
LATHE
Filed July 26, 1937 3 Sheets-Sheet 2
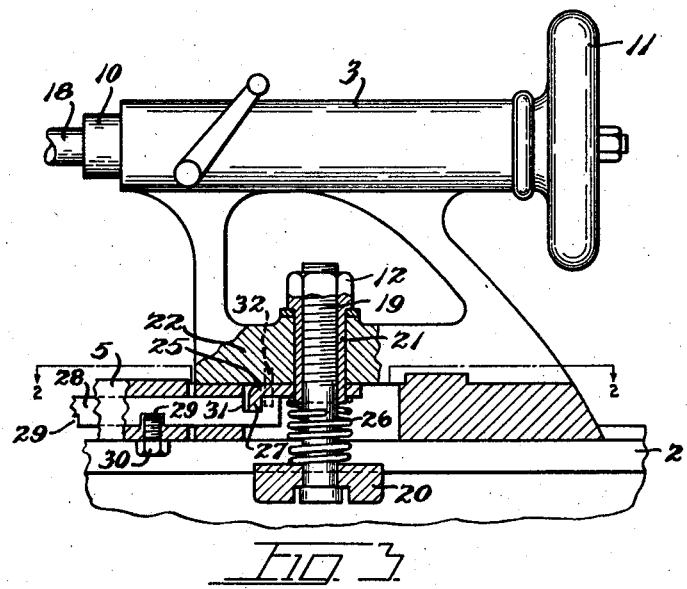
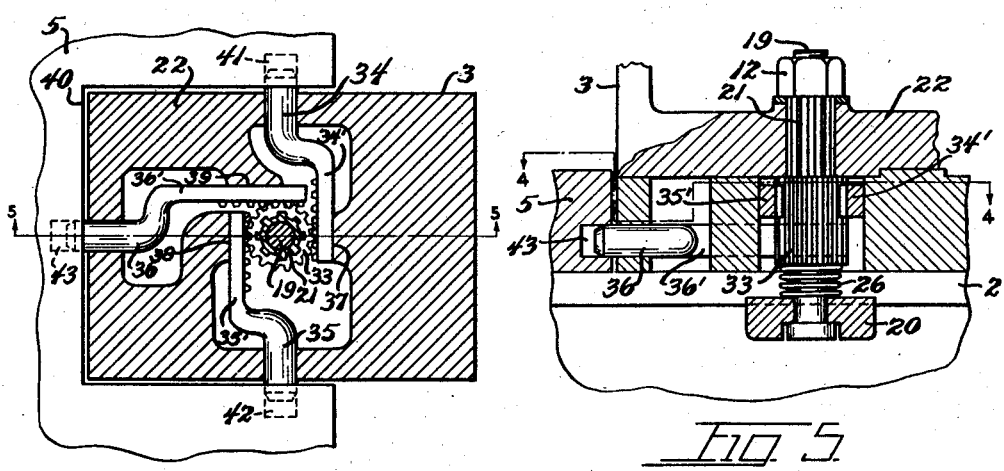
Inventors
HAROLD M. DUDEK
EDGAR E. KELLEMS
By Robert Cobb
Attorneys March 19, 1940. E. E. KELLEMS ET AL 2,194,393
LATHE
Filed July 26, 1937 3 Sheets-Sheet 3
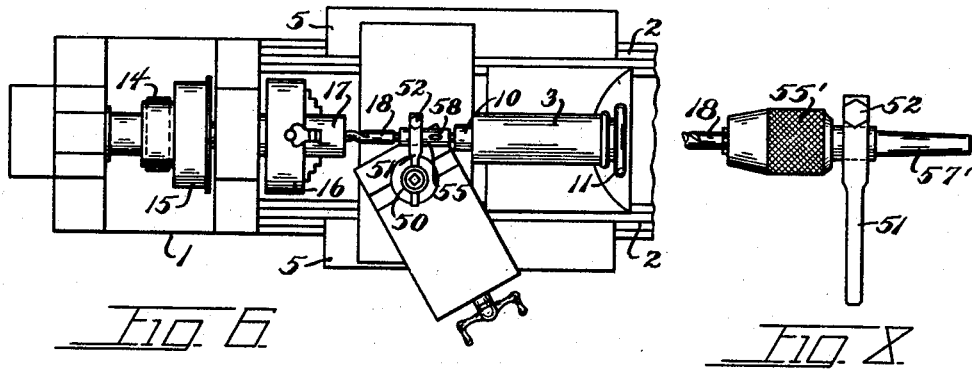
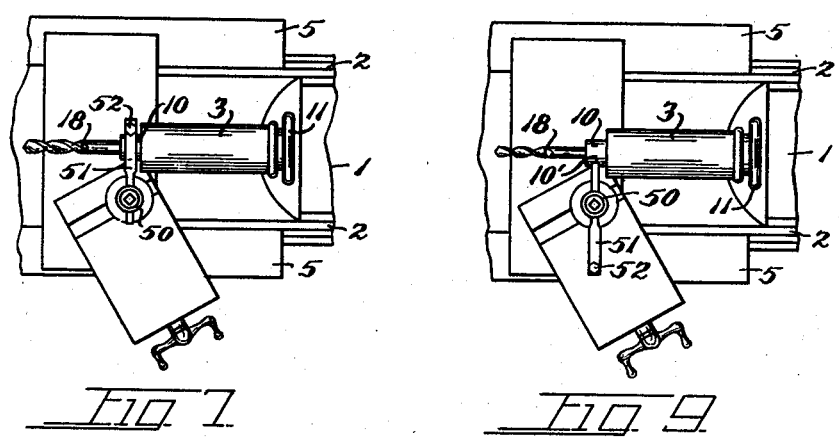
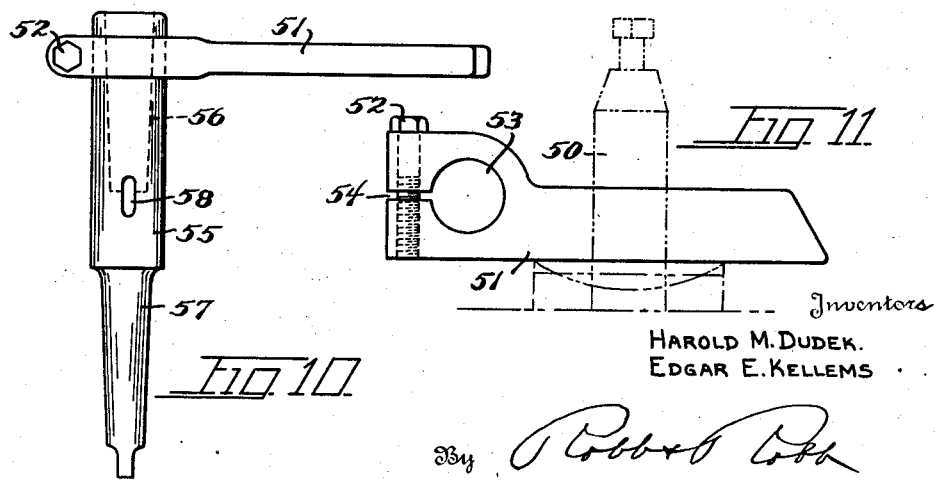
Inventors
HAROLD M. DUDEK.
EDGAR E. KELLEMS
By Robert Cobb
Attorneys Patented Mar. 19, 1940

2,194,393

UNITED STATES PATENT OFFICE 2,194,393

LATHE

Edgar E. Kellems and Harold M. Dudek,
Eugene, Oreg.

Application July 26, 1937, Serial No. 155,808

23 Claims. (Cl. 82—21)

This invention appertains to new and useful improvements in lathes or the like, and more especially, to novel instrumentalities for selectively clamping the lathe tailstock to the lathe bed for releasing and conditioning the same for movement along the lathe bed responsive to movement of another element of the lathe, such as, for example, the usual tool carriage. Stated somewhat more specifically, the invention primarily resides in a locking or other means for releasably attaching the lathe tailstock to the usual lathe carriage, so that the tail stock may be moved along the lathe bed by the carriage.

The conventional method of drilling material in a lathe requires that the tailstock be clamped in a fixed condition to the lathe bed on which the tailstock is mounted. The clamping action is effected through means of a clamping nut which forms a part of the usual tailstock assembly. The drill is mounted in the tailstock by removing the usual dead center and substituting the drill in its place. The material to be drilled is mounted in a chuck which is carried by the rotary headstock spindle. To commence the drilling operation, the power is turned on, thereby causing the headstock spindle, the chuck and the material mounted therein, to be rotated at the desired speed, and the drill is then brought into engagement with the material in the chuck by operating the tailstock hand-wheel so that it moves the tailstock spindle towards the material and feeds the drill into the material while the lathe is running. Ordinarily, it is necessary to withdraw the drill from the material after it has been entered a short distance, to clear the hole of chips. The deeper the hole, the more often it must be cleared. If the hole is not cleared, the drill will very likely break or become jammed and stop the lathe. The drill is moved out of or into the hole by turning the tailstock hand-wheel, which, of course, affords a relatively limited degree of feed of the drill.

When the hole is deeper than the feeding motion obtainable by operation of the tailstock hand-wheel, the tailstock spindle must be retracted as in backing out the drill, and then the tailstock is unclamped from the bed and moved along the bed by hand until the drill "bottoms" in the hole. The tailstock is then reclamped to the bed and the drilling operation continued by feeding the drill into the material through manipulation of the tailstock hand-wheel.

The usual method of clearing chips from the hole consumes a large part of the drilling time. Moreover, the capacity and efficiency of the average lathe, in the case of tailstock hand-wheel feed, is relatively limited due to the limitations of the strength and endurance of the tailstock parts. A common shop practice is to place a short bar between the hand-wheel spokes, or apply a wrench to the hand-wheel rim to increase the mechanical leverage and reduce the drill feeding effort. While this practice is not recommended by the lathe manufacturers, as the lathes are not designed for such abuse, it is nevertheless frequently availed of by machinists in an attempt to speed up the work and increase the output of the machine. The result is increased wear and breakage of tailstock parts.

Uniform feeding under the control of the tailstock hand-wheel is virtually impossible. This is particularly true when using a bar or wrench in the manner mentioned above. Moreover, the uniformity of feed is materially affected by the necessity of moving the tailstock to clear the hole, in the case of a drilling operation. Non-uniform feeding varies the chip length and thickness, and increases the number of clearing operations required. Thick chips tend to clog the drill, and thin chips tend to become wedged between the drill and the material being drilled. This clogging and wedging of the chips will mar the walls of the hole or bore, thereby making the hole irregular, and may even cause the drill to "drift" off-center.

Ordinarily, the drill must be cooled and lubricated, and if both of the lathe operator's hands are being used to turn the tailstock hand-wheel, as would ordinarily be the case, especially where the drill is fairly large, it becomes necessary to stop feeding the drill from time to time so as to enable the cooling fluid and/or lubricant to be applied. Obviously, this also slows up the drilling operation.

Our invention overcomes to a substantial degree the above mentioned difficulties and disadvantages, and greatly simplifies the drilling operation as performed on a lathe, and at the same time enables the operator to turn out better work with far greater accuracy and in a materially shorter time.

The primary object of the invention is to provide means for releasably interconnecting a lathe carriage or tailstock, or the like, with the lathe carriage or other equivalent moveable part, whereby to permit the lathe tailstock to be shifted responsive to shifting movement of the carriage.

Another important object of the invention is to provide lock means operable in response to release of the clamping means which serves to clamp the tailstock to the lathe bed, for establishing a positive interconnection between the tailstock and the lathe carriage, and which lock means is releasable to disconnect the tailstock from the carriage, responsive to actuation of the tailstock clamping means to clamp the tailstock to the lathe bed.

Still another object of the invention is to provide means for interconnecting the tailstock with the carriage in such manner that the distance between the tailstock and the carriage can be varied at will.

Among others, the invention has the following additional objects and advantages: reduces the hole clearing time in the case of drilling operations, due to the fact that the tail stock can be moved along the lathe bed in either direction, rapidly and accurately, by means of the carriage hand feed wheel when the tail stock is interconnected with the carriage, thus eliminating the necessity for frequent unclamping and reclamping of the tail stock on the lathe bed and enabling the drill to be withdrawn entirely from the hole by means of four or five quick turns of the carriage hand feed wheel instead of forty or fifty turns of the tail stock hand wheel; relieves the operator from hand feeding by allowing the use of the usual carriage power feed to cause the tailstock to move with the carriage when it is interlocked therewith; minimizes the number of hole clearing operations required due to uniformity of feeding speed when employing power feed of the carriage, thus making it possible to drill a hole much deeper without clearing; material and drill can be kept cool more readily since the operator's hands are free to apply cooling fluid and lubricant while employing power feed; faster drilling and longer drill life—carriage power feed gears may be set to feed the drill into the material at its maximum speed, since the drill is cooler and can be fed faster; holes drilled clean and straight due to uniformity of chips and elimination of drill clogging and side thrusts on drill; enables operator to take a position closer to the work by reason of the control of the drill feed by the carriage controls, as distinguished from the tailstock hand-wheel control which is located farther from the work; adaptability to operations other than drilling such as centering drilling, reaming, tapping, etc.; lighter and cheaper tailstock construction permissible—all drilling, reaming and tapping is preferably done with the tailstock attached to the carriage, and longitudinal movement of the tailstock spindle can be used only for adjusting the dead center when same is in use, and for removing tools from the tailstock, which requires only a small fraction of movement of the tailstock spindle now used in conventional lathes.

Other objects and advantages of the invention will be hereinafter described, and the novel features thereof defined by the appended claims.

In the drawings:

Figure 3 is an enlarged fragmentary view, partly in side elevation, and partly in vertical section, further illustrating the details of the combined tailstock clamping means and carriage interlocking means;

Figure 4 is a fragmentary detail view, partly in top plan and partly in horizontal section, illustrating a modified form of the invention, the section being taken approximately on the line 4—4 of Figure 5;

Figure 5 is a fragmentary detail view, partly in vertical section and partly in side elevation, of the construction shown in Figure 4, the section being taken approximately on the line 5—5 of Figure 4;

Figure 6 is a fragmentary top plan view of a lathe, illustrating a still further modified means for interconnecting the tailstock with the carriage;

Figure 7 is a fragmentary top plan view, generally similar to Figure 6, and showing a slightly different application of the interconnecting means of Figure 6;

Figure 8 is an enlarged detail view in top plan of the interconnecting means as applied to a standard drill chuck;

Figure 9 is a view, generally similar to Figure 7, and showing a still further modification of the interconnecting means;

Figure 10 is an enlarged detail view in top plan of the interconnecting means illustrated in Figure 6; and Figure 11 is an enlarged view in side elevation of the principal interconnecting element which is adapted to be mounted in the usual tool post shown in broken lines in this view, and which forms a part of each of the arrangements illustrated in Figures 6 to 9, inclusive.

Like reference characters designate corresponding parts in the several figures of the drawings.

Figure 1:
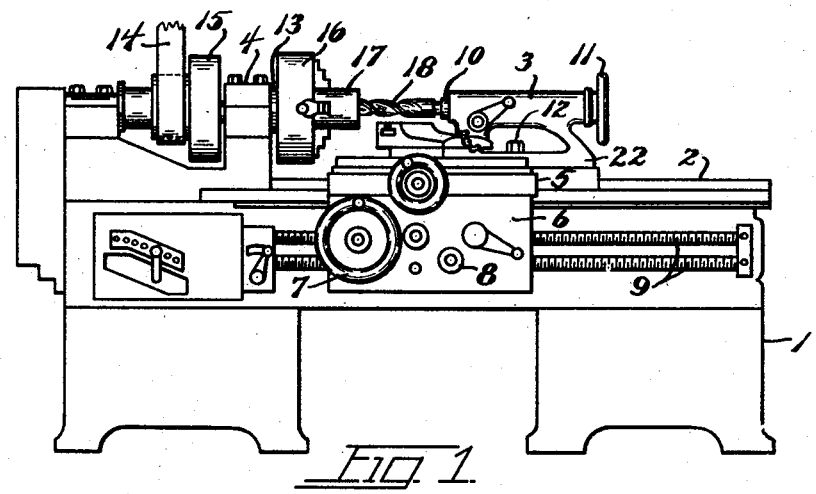
Figure 1 is a view, in side elevation, of a conventional lathe which may be of any suitable type, and having our invention incorporated therein.

While our invention, as illustrated in the drawings and herein described, is primarily applicable to lathes, it is to be understood that there is no intention of limiting the invention to this field, as the same may also be employed in other machines having similar or equivalent parts, as will become more apparent from the following description.

As shown in the drawings, 1 generally designates a lathe which may be of any conventional construction or otherwise. The lathe includes the usual lathe bed 2, on which is slidably mounted the tailstock 3, permiting longitudinal adjustment of the same towards and away from the head stock 4. 5 generally designates the usual carriage which is likewise mounted on the lathe bed 2 and is movable longitudinally along the bed. The carriage is provided, as usual, with an apron 6 at the front side thereof, which carries the carriage hand feed wheel 7 and the power feed clutch control 8 which cooperates with the lead screws 9 to as to cause the carriage to move along the lathe bed 2 automatically when the clutch control 8 is actuated to engage the clutch.

The tail stock 3 includes the usual tailstock spindle 10 and the tailstock hand-wheel 11, by means of which the spindle may be moved longitudinally. 12 designates the usual tailstock clamping nut by means of which the tailstock may be fixedly clamped to the lathe bed 2 when the nut is turned in one direction, and released to free the tailstock for bodily movement along the lathe bed when the nut is loosened by turning the same in the opposite direction.

Rotatably mounted in the headstock 4 is the usual headstock spindle 13 which is adapted to be driven by any suitable power means. As shown in the drawings, rotation of the headstock spindle is effected through means of a driving belt 14 and cone pulley 15. To perform a drilling operation on a workpiece, a chuck 16 is mounted on the headstock spindle, and the workpiece 17 is clamped in the chuck. The drill 18 is mounted in the tailstock 3 by substituting the same for the usual tailstock dead center (not shown). In the case of small drills, the drills are mounted in a drill chuck, and the drill chuck is in turn mounted in the tailstock, but for heavy work, where the drills are large, they may be directly inserted in the tailstock spindle.

So much of the lathe construction and the manner of operation of the same in performing drilling operations, as above described, is conventional and well known to those skilled in the art. Our improved features, as applied to lathes, will now be particularly described.

Figure 2:
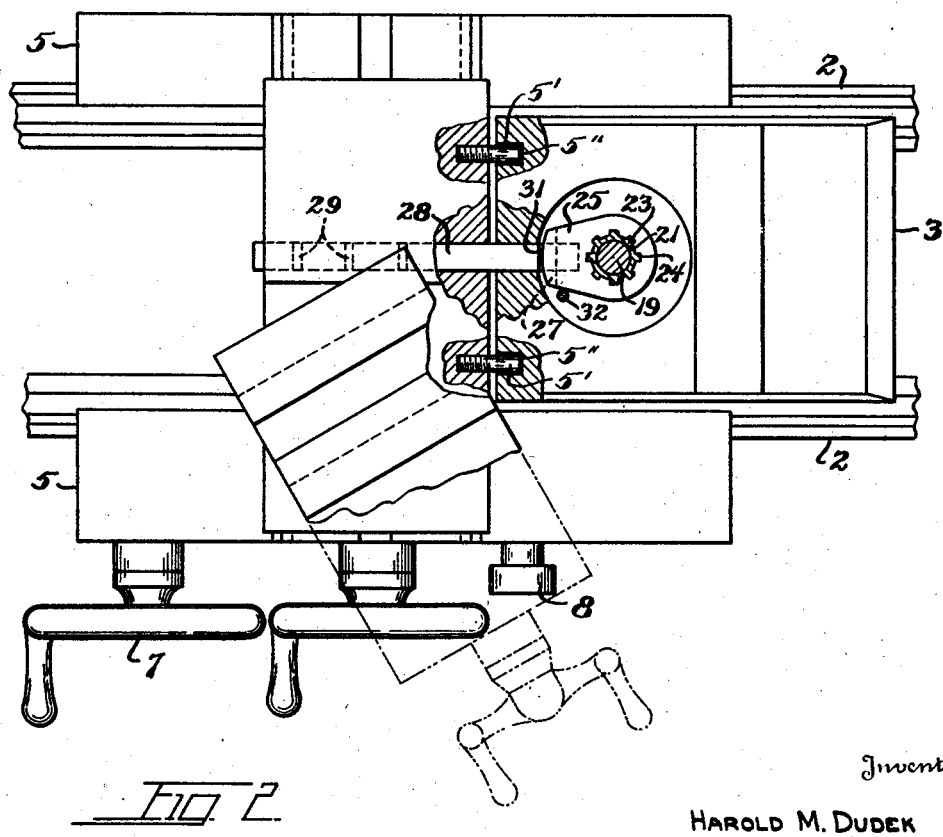
Figure 2 is an enlarged fragmentary view, partly in top plan, and partly in horizontal section, more particularly illustrating the combination tailstock clamping means and locking means for releasably interlocking the tailstock with the lathe carriage, the section being taken approximately on the line 2—2 of Figure 3.

Referring first to Figures 2 and 3 which illustrate one form of our invention, 19 designates the tailstock clamping bolt with which the clamping nut 12 is threadedly engaged. Mounted on the lower end of the bolt 19, is the usual clamping member 20 which engages the lathe bed when the clamping nut 12 is tightened on the bolt, to fixedly clamp the tailstock 3 to the lathe bed. According to our invention, the clamping nut 12 is modified from its usual form in that it is provided with a sleeve 21, preferably integrally formed with the nut or otherwise secured thereto. This sleeve extends downwardly from the lower side of the nut 12, through the base 22 of the tail stock 3, and projects slightly beyond the lower side of the tailstock base. The lower end of the sleeve is preferably provided with a plurality of male splines 23 (preferably six or eight splines), and these splines are adapted to be received in corresponding female splines 24 formed in a lock arm 25 which is adapted to be mounted on the lower end of the sleeve 21. Obviously, the splines serve to interlock the lock arm 25 and the sleeve 21 together so that upon rotation of the clamping nut 12 and sleeve 21, the lock arm will rotate therewith about the bolt 19 as an axis. The splines are normally maintained in engagement by a spring 26, which is mounted on the lower end of the bolt 19, with its upper and lower ends respectively abutting against the lock arm 25 and the clamping member 20. The male splines 23 on the sleeve 21 are of sufficient length to allow the lock arm 25 to be held in light frictional contact with the lower face of the tailstock base 22 by the expansion spring 26.

The lock arm 25 projects radially from its pivotal axis, and is formed at its outer or free extremity with a downwardly projecting flange or head 27 which is adapted to be moved into and out of interlocking engagement with the tool carriage 5 or a part carried thereby.

Preferably, the carriage 5 is provided with a lock bar 28 adjustably mounted thereon so that the lock bar may be extended to one side of the carriage, towards the tail stock, to assume different positions. As shown in the drawings, the lock bar is provided with a plurality of longitudinally spaced grooves or recesses 29 in its lower face. A set screw 30 mounted on the carriage 5 is adapted to be selectively engaged with the grooves or recesses 29 to secure the lock bar in the desired position of selective adjustment. The outer extremity of the lock bar 28 is provided with a transversely disposed groove or recess 31, formed in the upper face thereof, and with which the flange or head 27 on the lock arm 25 is adapted to be engaged when it is desired to interlock the tailstock 3 with the carriage 5 so as to permit longitudinal movement of the tailstock along the lathe bed 2, responsive to movement of the carriage.

As seen in Figures 2 and 3, the lock arm 25 on the tailstock 3 is interengaged with the lock bar 28 on the carriage 5, thereby establishing a positive interconnection between the carriage and the tailstock. To establish this interlock, as just described, the clamping nut 4, which forms a part of the tailstock assembly, is rotated in a counter-clockwise direction, as viewed from above, which causes the sleeve 21 and the lock arm 25 to be simultaneously rotated therewith in the same direction, and causes the lock arm head 27 to be moved into interengagement with the groove or recess 31 in the lock bar 28. A stop pin 32, formed as an integral part of the tailstock or as a separate part screwed into or otherwise fixed to the tailstock, depends below the tailstock base into the path of the lock arm 25, preferably at the forward side of the longitudinal center of the lock bar 28, and prevents the lock arm from moving too far, and insures that the lock arm and lock bar will be fully interengaged when the lock arm is swung around until it abuts against the stop pin. At the same time the interlock is established between the lock arm and the lock bar, through actuation of the tailstock clamping nut 12, the clamping member 20 is released from its former tight engagement with the lathe bed, thereby freeing the tailstock so as to permit its movement along the bed responsive to movement of the carriage. It will thus be seen that the arrangement is such as to afford maximum safety of operation, in that the tailstock cannot be interlocked with the carriage unless the tailstock clamp is released. In actual practice, these results are effected simultaneously, which is to say that the lock means which includes the lock arm 25, is actuated responsive to release of the tailstock clamping means. Ordinarily, about one-third of a turn of the clamping nut 4 is sufficient to release the clamping member 20 to free the tailstock for sliding movement on the lathe bed, and to simultaneously swing the lock arm 25 into operative interlocking engagement with the lock bar 28 on the carriage 5.

In releasing the lock arm 25 to disconnect the tailstock from the carriage, as by rotating the clamping nut 12 in a clockwise direction, as viewed from above, the lock arm will not ordinarily swing far enough to come into contact with the stop pin 32 until the parts of the tailstock clamp assembly become badly worn. If this condition should occur, however, the lock arm 25 may be readjusted by compressing the expansion spring 26 so as to allow the lock arm to be moved downwardly out of engagement with the sleeve 21, and then shifting the lock arm 25 about the axis of and relatively to the sleeve to a new position, after which it may be reengaged with the splines on the sleeve, and maintained in its adjusted position by the spring 26. In other words, wear of the parts can be compensated for by shifting the lock arm 25 around the sleeve 21 sixty or forty-five degrees, or any multiple thereof, depending on the number of splines used to interconnect the sleeve 21 with the lock arm 25.

The longitudinal adjustment of the lock bar 28 affords a selective adjustment of the distance between the tool carriage 5 and the tailstock 3 when these units are to be interlocked together for conjoint movement by a common control. The importance of this feature should be quite apparent when it is understood that it is frequently desirable to perform two or more operations upon the workpiece 17 at the same time. For example, sometimes it is advisable to turn down the outside of the workpiece 17 at the same time it is being drilled. By being able to adjust the drill to a given distance from the carriage, or vice versa, through means of the adjustment afforded by the adjustable lock bar 28, which, incidentally, is independent of the tailstock spindle adjustment, it is possible to position the turning tool and drill in their proper positions to permit drilling and turning of the workpiece at the same time. It is to be understood, however, that we do not wish to be limited to the precise means referred to above for effecting the adjustment of the distance between the tailstock and carriage since other suitable means may be substituted therefor, and will readily present themselves to those skilled in the art when the principles disclosed herein are understood.

It is also to be understood that our invention is not limited to power feeding of the tailstock, responsive to power feeding of the carriage. Several forms of manual carriage feed, other than the usual hand-wheel feed, are well known in the art of lathes and similar machines, and these manual feeds, such as, for example, lever tool slide feeds, may be employed where preferred.

In order to resist any tendency of the tailstock to become misaligned during operations of the lathe in the manner hereinbefore described, and especially during use of a centering tool for forming a centering hole in the workpiece preparatory to drilling, we preferably provide the carriage 5 with a pair of pins 5' suitably secured thereto as by threaded engagement therewith, which pins are adapted to be received in corresponding sockets 5" in the base of the tailstock 3, as best seen in Figure 2. The action of these pins 5' and sockets 5" will be readily understood, and while the same are not absolutely essential under all conditions, they are particularly advantageous to prevent misalignment of the tailstock in the case of heavy work. The pins 5' not only serve to prevent the tailstock from shifting laterally, but also aid the lock bar 28 in resisting upward forces caused by drilling operations, tending to raise the tailstock off of the lathe bed.

It can readily be seen that a lathe equipped with our invention is adaptable for small as well as large production work, and by employing a tailstock turret attachment, it will improve the efficiency in mass production far beyond the efficiency which can be attained in previously known lathes.

Passing now to the modified form of our invention illustrated in Figures 4 and 5, it will be seen that the same objects and results, as pointed out in the preceding description herein, can be obtained by substituting projectible and retractible bolts for the lock arm 25, shown in Figures 2 and 3. In this illustrated modification, the same tailstock clamping means for releasably clamping the tailstock 3 to the lathe bed 2, can be employed, said clamping means comprising the clamping nut 12 having a preferably continuous sleeve 21 depending from the lower side thereof, the clamping bolt 19 and the clamping member 20. As shown in Figures 4 and 5, a pinion 33 is mounted on the lower end of the sleeve 21, and preferably has a splined connection therewith as in the case of the lock arm 25 and sleeve 21 shown in Figures 2 and 3. It will be understood that a spring, such as spring 26 shown in Figures 2 and 3, may be employed to hold the pinion up lightly against the lower side of the tailstock base 22, to maintain the interengagement of the splines, while allowing for adjustment of the pinion rotatably about the lower end of the sleeve 21 for the purpose of taking up wear as the same occurs.

Lock bolts 34, 35 and 36 coact with the pinions 33 in such manner as to cause longitudinal movement of the lock bolts incident to rotation of the pinion. While we have shown three lock bolts, it is to be understood that the number is immaterial, as one or more lock bolts may be used, as desired. According to the arrangement shown in Figures 4 and 5, which we prefer by reason of the fact that it minimizes misalignment of the carriage and tailstock under working stresses, the lock bolts 34 and 35 are disposed in the same plane, and the lock bolt 36 is disposed in a plane above or below the bolts 34 and 35. The tails 34', 35' and 36' of the respective lock bolts have the form of racks which have meshing engagement with the pinion 33, and this meshing engagement is maintained by the bearing surfaces 37, 38 and 39, respectively. The outer ends of the lock bolts are disposed in suitable openings formed in the base 22 of the tailstock 3, and are slidable in said openings so that they may be projected beyond the respective outer faces of the tailstock base when the pinion 33 is rotated in one direction, and can be withdrawn into their openings sufficiently far so that their extreme ends can be disposed substantially flush with or somewhat within the outer walls of the tailstock base.

The tool carriage 5 is preferably recessed, as at 40, so as to at least partially receive the tailstock base when it is desired to interlock the tailstock with the carriage. The walls of the recess in the carriage are suitably apertured to provide sockets 41, 42 and 43 for receiving the respective extremities of the lock bolts 34, 35 and 36, when the latter are projected. The outer extremities of the lock bolts are preferably tapered so that when the same are projected into the sockets in the carriage, the tailstock will be raised slightly off of the lathe bed, thus minimizing the friction created during conjoint movement of the tailstock and carriage, and uniformly distributing the retracting forces caused by drill feeding or analogous operations.

Summarizing, it will be understood that in rotating the tailstock clamping nut in a counter-clockwise direction, as viewed from above, rotation is simultaneously imparted to the pinion 33, thereby causing the lock bolts 34, 35 and 36 to be projected into their respective sockets 41, 42 and 43 in the carriage 5, thereby establishing a positive and firm interlock between the tailstock and the carriage. This interlocking action is effected simultaneously with the release of the tailstock clamping means which normally serves to fixedly clamp the tailstock to the lathe bed, and may be said to take place responsive to the release of the tailstock clamping means. Rotation of the clamping nut in the opposite direction causes the lock bolts to be retracted, thereby disconnecting the tailstock from the carriage and also actuating the tailstock clamping means to clamp the tailstock to the bed.

The type of lock instrumentalities just described and shown in Figures 4 and 5 is particularly well suited for use in the more expensive lathes such as stub lathes, on which a large amount of heavy boring is generally performed. The average lathe tailstock has a very small bearing surface on the lathe bed, and excessive sliding of the tailstock along the lathe bed under load may wear the tailstock bearing surface sufficiently to throw it out of alignment. The tool carriage is designed to withstand the wear attending frequent shifting of the carriage along the lathe bed. Therefore, by locking the tailstock to the carriage in such manner as to cause the tailstock to be raised off of the lathe bed slightly, thus imposing the weight of the tailstock and the reacting forces thereon, on the carriage, undue wear of the tailstock bearing surface will be completely eliminated. In the modified form of the invention shown in Figures 4 and 5, motion is imparted to the tailstock responsive to movement of the carriage in the same manner and by the same means previously described, and accordingly, further description of the operation is unnecessary.

Referring now to the further modified forms of interconnecting means for interconnecting the tailstock with the lathe carriage, as shown in Figures 6 to 11, inclusive, and considering first Figures 6, 10 and 11, 50 designates the usual tool post which forms a part of the standard lathe equipment. As illustrated in these views, 51 desnates a clamping tool which is adapted to be mounted in the tool post 50 in the manner of an ordinary tool holder. The clamping tool 51 is provided with a clamping bolt 52 which serves to clamp the member 51 to any member received in the opening 53 formed in the end thereof. As shown best in Figure 11, the end of the tool 51 is split, as at 54, so that the opening 53 may be contracted by means of the clamping action of the clamping bolt 52.

If desired, the clamping tool 51 may be clamped to a fitted socket 55, as best seen in Figure 10, this socket 55 being a standard tool which will be recognized by those skilled in the art. The socket 55 has the usual tapered bore 56 in one end thereof, which is adapted to receive the shank of a drill or similar tool, while at the opposite end, the socket 55 is provided with the usual tang 57. 58 designates the usual slot provided in the socket 55 at the end of the tapered bore 56 for facilitating the removal of the drill or other tool received in the bore 56, as by enabling a wedge to be driven into the slot behind the end of the drill shank. According to our invention, we clamp the tool 51 to the socket 55, as shown in Figures 6 and 10, with the tool 51 secured in the tool post 50, and the tang 57 of the socket 55 tightly received in the spindle 10 of the tailstock 3. When these parts are so arranged, as shown in Figure 6, the carriage 5 will be interconnected with the tailstock 3 through the intermediary of the clamping tool 51 and the socket 55. Such an arrangement has been found satisfactory for small light lathes. The drill 18 or other equivalent tool is adapted to be received in the bore 56 of the socket member 55, as shown in Figure 6. Thus, when the carriage 5 is fed towards the workpiece 17, the tailstock 3 will be correspondingly moved along with the carriage due to the frictional interengagement of the tang 57 of the socket member 55 with the spindle 10 of the tailstock 3, it being understood, of course, that the usual tailstock clamp must first be released to enable the tailstock to move freely along the lathe bed 2 responsive to movement of the carriage.

Instead of clamping the tool 51 to a fitted socket member such as the member 55, a standard drill chuck 55' having a tang 57' may be substituted for the member 55, as illustrated in Figure 8. As will be understood from reference to this figure, the drill 18, or other equivalent tool, is received in the drill chuck 55', and the tang 57' is adapted to be forced tightly into the tailstock spindle 10, the arrangement being the substantial equivalent of that illustrated in Figure 6 and functioning in substantially the same manner.

We have found that for the larger lathes, and in the case of heavy work, it is better to have a positive interconnection between the carriage 5 and the tailstock 3. Such a positive interconnection is illustrated in Figure 7, wherein the clamping tool 51 is shown mounted in the tool post 50 and is directly clamped to the tailstock spindle 10. This type of interconnection between the tailstock and the carriage is more nearly the equivalent of that illustrated in Figures 1 to 5, inclusive, and is somewhat simpler and less expensive inasmuch as it does not require any modification of either the lathe carriage or the tailstock construction, but may be applied to any standard or conventional lathe without change, merely through supplying the additional clamping tool or member 51, for use in the manner just described.

As a still further application of the clamping member 51 to attain a positive interconnection between the lathe carriage and the tailstock, reference is now made to Figure 9, wherein the tailstock spindle 10 is shown as having a slot or notch 10' milled in one side thereof for receiving the rear end or tail of the clamping member 51, or the rear extremity of a standard tool holder usually provided with every lathe. In this case, the clamping member 51 or tool holder, whichever is available, is secured in the tool post 50 in a position reversed from that illustrated in Figure 7, but it will be readily understood that its function is to provide a simple and positive interconnection between the carriage and the tailstock which is applicable to practically all forms of lathes irrespective of size. While the specific details have been herein shown and described, the invention is not confined thereto, as changes and alterations may be made without departing from the spirit thereof as defined by the appended claims.

Having thus described our invention, what we claim as new and desire to secure by Letters Patent is—

1. In a lathe, the combination with a lathe bed, a tailstock movably mounted on said bed, a carriage also movably counted on said bed, and means for releasably clamping said tailstock to said bed, of means operable responsive to release of said clamping means for interconnecting said tailstock and carriage for conjoint movement.

2. In a lathe, the combination with a lathe bed, a tailstock movably mounted on said bed, a carriage also movably mounted on said bed, and means for releasably clamping said tailstock to said bed, of means for interconnecting said tailstock and said carriage for conjoint movement, said interconnecting means being so constructed and arranged that the same is automatically rendered inoperative incident to clamping said tailstock to said bed.

3. In a lathe, the combination with a lathe bed, a tailstock movably mounted on said bed, a carriage also movably mounted on said bed, and means for releasably clamping said tailstock to said bed, of means for interconnecting said tailstock and said carriage for conjoint movement, said interconnecting means and said tailstock clamping means being so constructed and arranged that the clamping means is automatically rendered inoperative incident to interconnection of the tailstock and carriage.

4. In a lathe, the combination with a lathe bed, a tailstock movably mounted on said bed, and a carriage also movably mounted on said bed, means for releasably clamping said tailstock to said bed, of means responsive to said tailstock clamping means for interconnecting said tailstock and said carriage for conjoint movement, said interconnecting means including means for adjusting the distance between the tailstock and carriage.

5. In a lathe, the combination with a lathe bed, a tailstock movably mounted on said bed, means for releasably clamping said tailstock to said bed, and a carriage also movably mounted on said bed, of means for interconnecting said tailstock and said carriage for conjoint movement, said interconnecting means comprising a lock bar mounted on said carriage, and a lock arm mounted on said tailstock and releasably engageable with said lock bar and movable into and out of engagement therewith responsive to said tailstock clamping means.

6. In a lathe, the combination with a lathe bed, a tailstock movably mounted on said bed, means for releasably clamping said tailstock to said bed, and a carriage also movably mounted on said bed, of means for interconnecting said tailstock and said carriage for conjoint movement, said interconnecting means comprising a lock bar mounted on said carriage, and a lock arm mounted on said tailstock and releasably engageable with said lock bar and movable into and out of engagement therewith responsive to release and clamping action respectively of said tailstock clamping means.

7. In a lathe, the combination with a lathe bed, a tailstock movably mounted on said bed, means for releasably clamping said tailstock to said bed, and a carriage also movably mounted on said bed, of means for interconnecting said tailstock and said carriage for conjoint movement, said interconnecting means comprising a lock bar adjustably mounted on said carriage, and a lock arm mounted on said tailstock and releasably engageable with said lock bar and movable into and out of engagement therewith responsive to said tailstock clamping means.

8. In a lathe, the combination with a lathe bed, a tailstock movably mounted on said bed, means for releasably clamping said tailstock to said bed, and a carriage also movably mounted on said bed, of means for interconnecting said tailstock and said carriage for conjoint movement, said interconnecting means comprising a lock bar mounted on said carriage, a lock arm on said tailstock releasably engageable with said lock bar and movable into and out of engagement therewith responsive to said tailstock clamping means, and means for limiting movement of said lock arm.

9. In a lathe, the combination with a lathe bed, a tailstock movably mounted on said bed, means for releasably clamping said tailstock to said bed, said means comprising a bolt carried by said tailstock, a clamping member carried by one end of the bolt and engageable with the lathe bed, and a clamping nut threadedly mounted on the opposite end of said bolt, and a carriage also movably mounted on said lathe bed, of means for interconnecting said tailstock and said carriage for conjoint movement, said interconnecting means including a lock arm pivotally mounted on the tailstock clamping bolt and operatively interconnected with the clamping nut so as to swing around the clamping bolt responsive to rotation of the clamping nut, and a lock bar mounted on the carriage and adapted to be interlockingly engaged by the lock arm when the latter is swung in one direction to release the tailstock clamping member, and to be released when the lock arm is swung in the opposite direction.

10. In a lathe, the combination with a lathe bed, a tailstock movably mounted on said bed, means for releasably clamping said tailstock to said bed, said means comprising a bolt carried by said tailstock, a clamping member carried by one end of the bolt and engageable with the lathe bed, and a clamping nut threadedly mounted on the opposite end of said bolt, and a carriage also movably mounted on said lathe bed, of means for interconnecting said tailstock and said carriage for conjoint movement, said interconnecting means including a sleeve depending from the clamping nut aforesaid and surrounding the clamping bolt, a lock arm mounted on and having splined interengagement with the sleeve whereby to cause the lock arm to swing about the axis of the clamping bolt responsive to rotation of the clamping nut, and a lock bar mounted on said carriage with which the lock arm is adapted to be releasably interengaged responsive to rotation of the clamping nut.

11. In a lathe, the combination with a lathe bed, a tailstock movably mounted on said bed, means for releasably clamping said tailstock to said bed, said means comprising a vertically disposed bolt carried by said tailstock, a clamping member carried by the lower end of the bolt and engageable with the lathe bed, and a clamping nut threadedly mounted on the upper end of said bolt, and a carriage also movably mounted on said lathe bed, of means for interconnecting said tailstock and said carriage for conjoint movement, said interconnecting means including a sleeve depending from the clamping nut aforesaid and surrounding the clamping bolt, a lock arm mounted on the lower end of the sleeve and having splined interengagement with the sleeve whereby to cause the lock arm to swing about the axis of the clamping bolt responsive to rotation of the clamping nut, yieldable means for normally maintaining the lock arm in such position that its splined engagement with the sleeve is maintained, while permitting movement of the lock arm relatively to the sleeve to allow a relative rotative adjustment between the lock arm and the sleeve, and a lock bar mounted on said carriage and with which said lock arm is adapted to be releasably interengaged responsive to rotation of the clamping nut.

12. In a lathe, the combination with a lathe bed, a tailstock movably mounted on said bed, means for releasably clamping said tailstock to said bed, said means comprising a bolt carried by said tailstock, a clamping member carried by one end of the bolt and engageable with the lathe bed, and a clamping nut threadedly mounted on the opposite end of said bolt, and a carriage also movably mounted on said lathe bed, of means for interconnecting said tailstock and said carriage for conjoint movement, said interconnecting means including a sleeve depending from the clamping nut aforesaid and surrounding the clamping bolt, a lock arm mounted on and having splined interengagement with the sleeve whereby to cause the lock arm to swing about the axis of the clamping bolt responsive to rotation of the clamping nut, a lock bar mounted on said carriage and with which the lock arm is adapted to be releasably interengaged responsive to rotation of the clamping nut, and abutment means carried by the tailstock and positioned in the path of movement of the lock arm so as to limit the swinging movement of the lock arm.

13. In a lathe, the combination with a lathe bed, a tailstock movably mounted on said bed, means for releasably clamping said tailstock to said bed, said means comprising a bolt carried by said tailstock, a clamping member carried by one end of the bolt and engageable with the lathe bed, and a clamping nut threadedly mounted on the opposite end of said bolt, and a carriage also movably mounted on said lathe bed, of means for interconnecting said tailstock and said carriage for conjoint movement, said interconnecting means including an adjustable part operable responsive to rotation of said clamping nut, and means for establishing an interlock with said carriage responsive to operation of said adjustable part.

14. In a lathe, the combination with a lathe bed, a tailstock movably mounted on said bed, means for releasably clamping said tailstock to said bed, said means comprising a clamping bolt carried by said tailstock, a clamping member carried by one end of the bolt and engageable with the lathe bed, and a clamping nut threadedly mounted on the opposite end of said bolt, and a carriage also movably mounted on said lathe bed, of means for interconnecting said tailstock and said carriage for conjoint movement, said interconnecting means including a sleeve depending from the clamping nut aforesaid and surrounding the clamping bolt, a pinion mounted on and having splined interengagement with the sleeve whereby to cause the pinion to be rotated about the axis of the clamping bolt responsive to rotation of the clamping nut, and at least one lock bolt shiftably mounted on the tailstock, said lock bolt being provided with a rack having meshed engagement with the pinion, and said lock bolt being adapted to have interlocking engagement with the carriage when the lock bolt is projected outwardly relatively to the tailstock, and to release the tailstock from the carriage when the lock bolt is retracted.

15. In a lathe, the combination with a lathe bed, a tailstock movably mounted on said bed, means for releasably clamping said tailstock to said lathe bed, and a carriage also movably mounted on said lathe bed, of means for interconnecting said tailstock and said carriage for conjoint movement, said interconnecting means including a shiftable lock bolt carried by said tailstock and adapted to have interlocking engagement with said carriage when the lock bolt is shifted in one direction, and to release said tailstock from the carriage when the lock bolt is shifted in another direction.

16. In a lathe, the combination with a lathe bed, a tailstock movably mounted on said bed, means for releasably clamping said tailstock to said bed, and a carriage also movably mounted on said lathe bed, of means for interconnecting said tailstock and said carriage for conjoint movement, said last named means including means for elevating the tailstock off of the lathe bed so that the weight thereof is supported by the carriage when the tailstock is interconnected with the carriage.

17. In a machine of the class described, a bed, a pair of members slidably mounted on said bed, means for fixedly clamping at least one of said members to said bed, and means for positively interconnecting said members so that sliding motion imparted to one of the members will be transmitted to the other member, said interconnecting means being operable at will responsive to operation of the clamping means aforesaid.

18. In a lathe, the combination with a lathe bed, a tailstock movably mounted on said bed, and a carriage also movably mounted on said bed, of means for interconnecting said tailstock and carriage for conjoint movement, said means including a clamping member adapted to be fixedly mounted on the carriage and having operative connection with the tailstock.

19. In a lathe, the combination with a lathe, bed, a tailstock movably mounted on said bed, and a carriage also movably mounted on said bed, of means for interconnecting said tailstock and carriage for conjoint movement, said means including a clamping member adapted to be fixedly mounted on the carriage and having operative connection with the tailstock through the intermediary of a tool socket adapted to be mounted in the tailstock spindle.

20. In a lathe, the combination with a lathe bed, a tailstock movably mounted on said bed, and a carriage also movably mounted on said bed, of means for interconnecting said tailstock and carriage for conjoint movement, said means including a clamping member adapted to be fixedly mounted on the carriage and having operative engagement with the tailstock spindle.

21. In a lathe, the combination with a lathe bed, a tailstock movably mounted on said bed, and a carriage also movably mounted on said bed and carrying the usual tool post, of means for interconnecting said tailstock and carriage for conjoint movement, said means including a member adapted to be fixedly mounted in the tool post so as to be disposed substantially transversely respecting the lathe bed, and said tailstock having the usual spindle provided with a recess therein for receiving one end of the member aforesaid whereby to establish interlocking engagement of the member with said spindle.

22. In a lathe, the combination with a lathe bed, a tailstock movably mounted on said bed, and a carriage also movably mounted on said bed, of means for interconnecting said tailstock and said carriage for conjoint movement, and means operatively associated with the carriage and tailstock for preventing misalignment thereof during operation of the lathe while the carriage and tailstock are interconnected.

23. In a lathe, the combination with a lathe bed, a tailstock movably mounted on said bed, and a carriage also movably mounted on said bed, of means for interconnecting said tailstock and said carriage for conjoint movement, and means operatively associated with the carriage and tailstock for preventing misalignment thereof during operation of the lathe while the carriage and tailstock are interconnected, said last named means comprising at least one protuberant part carried by one of the tailstock and carriage elements aforesaid, and the other element having a socket therein for receiving the protuberant part.

EDGAR E. KELLEMS.
HAROLD M. DUDEK.